United States Patent
Atrash et al.

(10) Patent No.: US 11,480,968 B1
(45) Date of Patent: Oct. 25, 2022

(54) SYSTEM FOR DYNAMIC POSITIONING OF AN AUTONOMOUS MOBILE DEVICE WITH RESPECT TO A USER

(71) Applicant: AMAZON TECHNOLOGIES, INC., Seattle, WA (US)

(72) Inventors: Amin Hani Atrash, Los Altos, CA (US); Saurabh Gupta, Sunnyvale, CA (US); Sandeep Samdaria, Sunnyvale, CA (US); Raumi Sidki, San Jose, CA (US); Xiaowen Mao, Sunnyvale, CA (US); Morelle Arian, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 16/116,285

(22) Filed: Aug. 29, 2018

(51) Int. Cl.
  *G05D 1/00* (2006.01)
  *G05D 1/02* (2020.01)
(52) U.S. Cl.
  CPC ......... *G05D 1/0214* (2013.01); *G05D 1/0088* (2013.01); *G05D 1/0246* (2013.01); *G05D 2201/0211* (2013.01)
(58) Field of Classification Search
  CPC .... G05D 1/021; G05D 1/0088; G05D 1/0246; G05D 2201/0211; G05D 1/0219; G05D 2201/0217; G05D 1/02; G05D 1/0214; G05D 1/0231; G05D 1/0234; G05D 1/0274; G05D 1/028; G05D 2201/0213; G05D 1/0238; G05D 1/0253; G05D 1/0276; G05D 1/0285; G05D 2201/0208; G05D 3/125; G01S 17/931; G01S 5/02; G01S 5/0252; G01S 1/70; G01S 13/74; G01S 13/865; G01S 13/931; G01S 17/86; G01S 5/16
  USPC .......................................................... 701/26
  See application file for complete search history.

(56) References Cited

U.S. PATENT DOCUMENTS

| | | | |
|---|---|---|---|
| 2018/0061134 A1* | 3/2018 | Ota | B60R 1/00 |
| 2018/0173242 A1* | 6/2018 | Lalonde | G05D 1/0214 |
| 2020/0286268 A1* | 9/2020 | Huang | G06F 8/34 |

FOREIGN PATENT DOCUMENTS

| | | | | |
|---|---|---|---|---|
| KR | 20130047278 A | * | 5/2013 | |
| KR | 20190053001 A | * | 5/2019 | B25J 9/1679 |
| WO | WO-2019173396 A1 | * | 9/2019 | G06F 3/012 |

* cited by examiner

*Primary Examiner* — Abby Y Lin
*Assistant Examiner* — Hossam M Abd El Latif
(74) *Attorney, Agent, or Firm* — Lindauer Law, PLLC

(57) ABSTRACT

A robot moves about an environment and may interact with a user. A waypoint specifies where the robot is to move to with respect to the user while a proxemic cost map is used to plan the path to the waypoint. User input or preferences may be used to modify the waypoint or the proxemic cost map. The waypoint may specify a particular distance and bearing with respect to the user. The proxemic cost map may be oriented with respect to the user and specifies costs for particular areas. For example, an area immediately behind the user may have a very high cost while an area in front of the user may have a low cost. Based on the waypoint and the proxemic cost map, a path is selected and the robot moves along that path, avoiding the high cost areas in favor of the low cost areas if possible.

20 Claims, 9 Drawing Sheets

| Task 602 | Proxemic Cost Map Used 604 | Preferred Angle 406 | Interaction Distance 408 |
|---|---|---|---|
| Present incoming video call | Approach | ±45 | 1.5 m |
| Present private reminder | Approach | ±30 | 0.5 m |
| Present public reminder | Approach | ±60 | 1.5 m |
| Accept touch input | Approach | ±15 | 0.3 m |
| Continue video call while user in motion | Follow | 100-135 | 1.5 m |
| Sentry patrol | Avoid | - | - |
| Recharge battery | Avoid | - | - |
| Find specified user | Avoid + Approach | ±45 | - / 2 m |

FIG. 6

SYSTEM FOR DYNAMIC POSITIONING OF AN AUTONOMOUS MOBILE DEVICE WITH RESPECT TO A USER

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates tasks and their associated proxemic cost maps, preferred angles, and interaction distances, according to some implementations.

Figure 1:
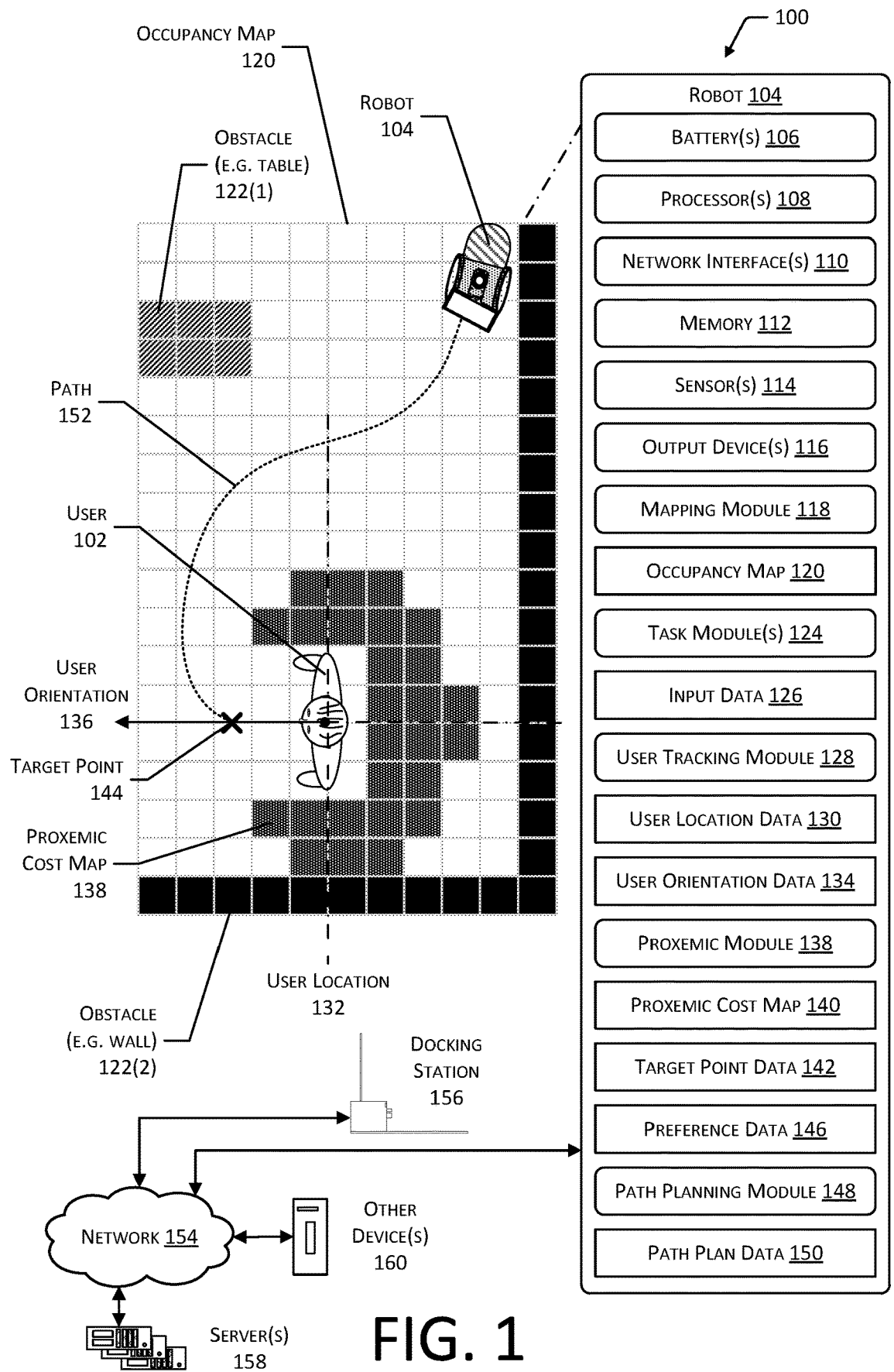
FIG. 1 illustrates a system that includes a robot which is able to dynamically position itself with respect to a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, a robotic assistant (robot) may perform various tasks. The robot is capable of autonomous movement, allowing it to move from one location in the environment to another without being "driven" or remotely controlled by the user or other human. Some of the tasks the robot performs may involve the robot moving about an environment.

Because users may be in the environment, the robot should be able to move and position itself with respect to these users in a way that is consistent with the requirements of the task and the expectations of the users. For example, a task that involves a user touching a control on the robot requires the robot to be within reach of the user. In another example, in most circumstances a user would not expect or desire a robot to approach from directly behind the user.

If the robot does not move in a way that is consistent with the requirements of the task, then the task may be left incomplete. Continuing the earlier example, if the robot stays out of reach of the user, the user would be unable to touch the control on the robot.

If the robot does not move in a way that is consistent with the expectations of the user, the robot may interfere with the user or produce an undesirable result. For example, if the robot approaches a user from directly behind, where the user is unable to see, the robot may startle the user. In another example, if the user expects the robot to follow slightly behind and to one side, having the robot follow abeam to the user or directly behind may result in the user changing their path to avoid collision with the robot.

The tasks may involve various behaviors with respect to the users in the environment. These behaviors may include approach behavior, follow behavior, and avoid behavior. For example, a task such as "present an incoming video call" may involve the robot using the approach behavior to move to a position in front of the user. In another example, the user may request that the robot follows the user, involving a follow behavior. In yet another example, the robot may perform a sentry task and use an avoid behavior.

Described in this disclosure is a system that implements techniques for selecting, determining, and utilizing a proxemic cost map that may be used in conjunction with other maps, such as an occupancy map, to determine a path for the robot in the environment. Tasks that involve behaviors such as approach and follow may result in the system determining a target point and distance that is based on the location and orientation of the user. For example, an approach behavior may have a target point that is directly in front of the user. The interaction distance between the user and the target point may be determined based on the task. Continuing the example, if the task may involve the user providing input to a touch screen on the robot, the interaction distance may be 0.4 meters, placing the robot within reach.

A proxemic cost map is determined based at least in part on the task. Continuing the example, if the task involves an approach, a particular proxemic cost map that permits the robot to approach is used. The proxemic cost map may be represented as a plurality of cells, such as a grid array, that is positioned with respect to the location of the user and oriented with respect to the orientation of the user. The proxemic cost map provides a cost value for the traversal of the robot through a particular area or region. During path planning, the robot may select a path that involves a lowest cost. For example, the proxemic cost map may assign relative high cost values to an area that is behind the user and in their visual blind spot, while the area directly in front of the user may have relatively low cost values.

The proxemic cost maps may be generalized and used for many users. In other implementations, the proxemic cost maps may be customized to a particular user. For example, a user with impaired vision on their right side may have a proxemic cost map that places high cost values on the right side and low cost values on the left side.

During operation of the system, the robot determines the types of behavior associated with the task. For example, the task may involve one or more of an approach, follow, or avoid behavior. These behaviors may be specific to particular users. For example, if the robot is trying to find a particular user, it may avoid other users and then approach the particular user.

In determining a planned path, the robot may utilize an occupancy map. The occupancy map provides information that is indicative of placement of one or more of an object in, or an aspect of, an area that impedes movement in the physical environment. For example, the occupancy map may indicate the presence of walls, furniture, and so forth. Continuing the example, the occupancy map includes areas the robot is not able to traverse, such as a particularly thick shag carpet that may bind the wheels of the robot.

In some implementations, the occupancy map may comprise a plurality of cells with each cell of the plurality of cells representing a particular area in the physical environment and having an obstacle cost value that is indicative of whether the cell is able to be traversed by the robot. For example, a high obstacle cost value may indicate a wall or piece of furniture that the robot is not able to pass through, while a low obstacle cost value may indicate a smooth flat floor.

Sensors provide data that is indicative of the location of the robot, as well as the location and orientation of the user. These sensors may be on the robot, elsewhere in the environment, and so forth. If the task and associated behavior involves the robot being near the user, a target point is determined. The target point is within a preferred angle with respect to the orientation of the user, and is located at an interaction distance from the user's location. For example, the preferred angle for an approach behavior may be plus or minus 45 degrees of a user's orientation such as the direction their body is pointing, along their line of travel, and so forth.

Once the target point has been determined, a planned path is determined. The planned path uses information such as the occupancy map and the proxemic cost map associated with the task to determine a path that the robot will take to get from the current location to the target point. The use of the occupancy map prevents the robot from planning a path that passes through an object, such as a wall or piece of furniture. The use of the proxemic cost map results in a path that is consistent with the expectations of the user. For example, the obstacle cost value of the occupancy map for a particular cell may be summed with the cost value of the corresponding particular cell in the proxemic cost map to produce a combined cost value. The path planning module may determine a lowest cost path based on the combined values for a plurality of the cells. The robot may then move along the path.

In some implementations, the system may adjust parameters such as the preferred angle, interaction distance, shape and cost values associated with the proxemic cost map, and so forth. User input may be obtained either explicitly or implicitly. Explicit input may involve a user ordering the robot to "come closer" or "move back". Implicit input may involve the user changing their position with respect to the robot, such as stepping towards the robot or moving away from the robot, turning towards the robot, and so forth.

The system may adjust based on this input. These adjustments may be associated with a particular user, particular task, environmental conditions, and so forth. For example, if for the task involving "present incoming video call" users are moving to a distance of 1 meter (m) rather than the default of 1.5 m, the system may adjust the interaction distance to 1 m when the task is subsequently performed.

The use of the proxemic cost map improves the ability of the robot to safely and effectively operate around and with users. The use of the proxemic cost map to determine the path of the robot results in a path that allows the robot to complete tasks while moving in a fashion that is consistent with user expectations. The factors that specify the target point, such as interaction distance, position, and preferred angle, may be easily modified, allowing for improved flexibility and customization during operation. Likewise the size, shape, and cost values associated with the proxemic cost map may be easily modified, allowing for customization for new behaviors, particular tasks, particular users, and so forth.

The use of the system described is also computationally more efficient and is more easily incorporated into other systems. For example, computational efficiency is improved because the combination of the occupancy map cost values and the proxemic cost map cost values may use a summation operation. The proxemic cost map may be readily overlaid upon the occupancy map, allowing the proxemic cost map and resulting behaviors to be implemented without significant changes to an existing autonomous navigation system. As a result, the consideration of the proxemic cost map into path planning may be done without adding significant computational steps.

Illustrative System

FIG. 1 illustrates a system 100 in which a user 102 uses a robot 104 that is able to dynamically position itself with respect to the user 102, according to some implementations. The robot 104 may include a battery(s) 106 to provide electrical power for operation of the robot 104. The battery 106 may be rechargeable, allowing it to store electrical energy obtained from an external source. In other implementations, a wireless power receiver may be used to provide power for operation of the robot 104, recharge the battery 106, and so forth. The robot 104 may include a hardware processor(s) 108 (processors), a network interface(s) 110, a memory(s) 112, sensors 114, and output devices 116. These devices are discussed in more detail with regard to FIGS. 2 and 3.

A mapping module 118 may be stored in the memory 112. The mapping module 118 may use data from the sensors 114 to determine an occupancy map 120 or other representation of the physical environment. For example, one or more cameras may obtain image data of the environment. The image data may be processed to determine the presence of obstacles 122. The occupancy map 120 may comprise data that indicates the location of one or more obstacles 122, such as a table 122(1), wall 122(2), and so forth. In some implementations, the occupancy map 120 may comprise a plurality of cells with each cell of the plurality of cells representing a particular area in the physical environment and having an obstacle cost value that is indicative of whether the cell contains an obstacle 122. An obstacle 122 may comprise an object or feature that prevents or impairs traversal of the robot 104. For example, an obstacle 122 may comprise a wall, stairwell, and so forth. In this illustration, the darker the shading in the cell, the greater the obstacle cost value associated with that cell. For example, cells associated with the wall 122(2) are black as they present a high obstacle cost value. Continuing the example, cells associated with the smooth flat floor are white (no shading).

One or more task modules 124 may be stored in the memory 112. The task modules 124 may comprise instructions that, when executed by the processor 108 perform a task. For example, a video call module may be used to have the robot 104 find a particular user 102 and present a video call using the output devices 116. In another example, a sentry task module 124 may be used to have the robot 104 travel throughout the home, avoid users 102, and generate a report as to the presence of an unauthorized person.

During operation, the robot 104 may determine input data 126. The input data 126 may include sensor data from the sensors 114 onboard the robot 104. For example, the input data 126 may comprise a verbal command provided by the user 102 and detected by a microphone on the robot 104.

In some situations, the task performed by the robot 104 may include moving the robot 104 within the environment. These tasks may involve various behaviors by the robot 104. These behaviors may include an approach behavior, a follow behavior, an avoid behavior, and so forth. For example, the robot 104 may be directed to perform a task that includes presenting a video call on a display output device 116 to a first user 102. This task may include an avoidance behavior causing the robot 104 to avoid other users 102 while seeking out the first user 102. When found, the robot 104 uses an approach behavior to move near the first user 102.

The robot 104 may include in the memory 112 a user tracking module 128. The user tracking module 128 may use data from the sensors 114 on the robot 104 or other sensors in the environment. The user tracking module 128 processes the data to determine user location data 130 indicative of a user location 132 in the environment. The user location data 130 may be indicative of coordinates within the environment that are indicative of a point associated with the user 102. For example, the user location data 130 may indicate a centroid of the area occupied by the user 102 with respect to a fixed coordinate system used to represent locations within the environment.

The user tracking module 128 may also process the data to determine user orientation data 134 indicative of a user orientation 136 in the environment. The user orientation data 134 is indicative of a direction with respect to a fixed reference. For example, the user orientation data 134 may be indicative of a heading as measured with respect to magnetic north, or an angle with respect to an axis of the fixed coordinate system. In some implementations the user orientation data 134 may be indicative of an angle that extends from a reference point with respect to the user 102 along a direction that is specified with respect to one or more features of the user 102. For example, the user orientation data 134 may be based on a position of one or more of the user's 102 head, shoulders, skeleton, feet, eyes, and so forth. In another example, the user orientation data 134 may be based at least in part on a gaze direction of the user 102, that is indicative of which direction the user 102 is looking. In one implementation, the user orientation data 134 may indicate the line that is perpendicular from a line extending through the shoulders of the user 102, and extending away from the user 102 in a ventral direction. For example, if the user 102 is standing facing East, the user orientation data 134 may indicate 90 degrees. In another implementation, the user orientation data 134 may indicate the line that is perpendicular to a line extending through both eyes of the user 102 and starts at a midpoint between the eyes.

A proxemic module 138 may be used to select, generate, modify, or otherwise manipulate a proxemic cost map 140. The proxemic cost map 140 may be represented as a plurality of cells, such as a grid array, that is positioned with respect to the user location data 130 and oriented with respect to one or more of the user orientation data 134 or a target point 144 as described below. The proxemic cost map 140 provides a proxemic cost value for the traversal of the robot through a particular area or region. While the proxemic cost map 140 is depicted as a grid, the proxemic cost map 140 may be represented in terms of a mathematical function. For example, the proxemic cost map 140 may comprise a function that, when provided with input including a relative distance and bearing with respect to the user location data 130 and the user orientation 136, produces as output a cost value. The proxemic cost map 140 may have a particular orientation as exhibited by areas with different proxemic cost values. For example, the proxemic cost values associated with cells in front of the user 102 may be lower than the proxemic cost values associated with cells behind the user 102.

The proxemic module 138 may access previously stored proxemic cost maps 140. For example, different proxemic cost maps 140 may be generated for different behaviors, such as approach, follow, avoid, and so forth. The proxemic cost map 140 may be considered to represent areas where movement of the robot 104 near and with respect to the user 102 may be encouraged and discouraged.

In some implementations, the proxemic module 138 may select proxemic cost maps 140 based on localization settings. For example, users 102 in different countries may have different expectations as to how the robot 104 should move with respect to them, and so use different proxemic cost maps 140. Accordingly, the proxemic module 138 may select proxemic costs maps 140 that are consistent with those expectations.

The proxemic module 138 may modify the proxemic cost map 140 based on input. For example, if the user 102 provides input indicative of approval or disapproval of a particular behavior, the proxemic module 138 may change the cost values in the proxemic cost map 140 for subsequent use. Continuing the example, if the user 102 says "don't approach on my right" the proxemic module 138 may increase the cost values of the cells on the right size of the proxemic cost map 140.

In one implementation, the proxemic cost map 140 may be visualized as moving with the user 102. For example, as the user 102 walks through the room, the proxemic cost map 140 associated with that user 102 moves with them. Continuing the example, the proxemic cost map 140 may be centered on the user location 132 and aligned with the user orientation 136. If the user 102 approaches an area with an obstacle cost value that is greater than a threshold, such as a wall 122(2), the proxemic cost map 140 may be rotated with respect to the user location 132.

When a task involves the robot 104 approaching or following a user 102, the proxemic module 138 may determine target point data 142 indicative of a target point 144. The location of the target point 144 may be based at least in part on the user location data 130, the user orientation data 134, and the occupancy map 120. For example, the target point 144 may be located within a preferred angle with respect to the user orientation 136. If the occupancy map 120 indicates that an obstacle 122 is present within the preferred angle, the target point 144 would instead be placed at a location that is unobstructed. For example, the target point 144 may be outside of the preferred angle.

The target point 144 is located at an interaction distance from the user 102. The interaction distance may be based at least in part on the task. For example, a task that involves the user 102 possibly manipulating a control on the robot 104 would have an interaction distance that is close enough to allow that contact. The target point 144 is discussed in more detail with regard to FIG. 4.

In some implementations, the proxemic module 138 may use the target point 144 to determine the orientation of the proxemic cost map 140. For example, if the user 102 is in front of an obstacle 122, such as when seated at a table, the target point 144 may be located at an unobstructed area to the right or left of the user 102. In implementations where the target point 144 has been relocated due to an area having an obstacle cost value that exceeds a threshold value, the proxemic module 138 may align the proxemic cost map 140 with respect to the target point 144, instead of the user orientation 136.

The proxemic module 138 may use preference data 146 during operation. The preference data 146 may specify a preferred angle for placement of the target point 144. The preference data 146 may specify the interaction distance. In some implementations the preference data 146 may be associated with a particular group of users 102, individual user 102, and so forth. For example, the user 102(1) may specify that they prefer an interaction distance that is greater than a default interaction distance for a particular task or all tasks. In some implementations, the preference data 146 may associate a particular proxemic cost map 140 with a particular user 102.

The robot 104 includes a path planning module 148. The path planning module 148 generates path plan data 150 that is indicative of a path 152 through the environment. During operation, the path planning module 148 may use as input the occupancy map 120 and the proxemic cost map 140. The path planning module 148 may accept as input a destination point in the environment and then determines the path plan data 150 that describes a path 152 to that point. The path planning module 148 may determine a path 152 that exhibits a lowest total cost based on the combined cost values, or a sum of, the obstacle cost values in the occupancy map 120 and the cost values in the proxemic cost map 140 for cells that are traversed by the path 152.

In other implementations the path planning module 148 may use other techniques to determine the path 152. For example, the path planning module 148 may be configured to determine a path 152 that does not exceed a maximum combined cost in at least one cell. In another example, the path planning module 148 may determine the path 152 based on length of path, transit time, combined costs, and so forth.

If the task involves the robot 104 approaching or following the user 102, the path planning module 148 may use the target point data 142 as the destination to determine the path plan data 150. The resulting path 152 represented by the path plan data 150 may lead from the current location of the robot 104 to the target point 144 and takes into consideration the presence of obstacles 122 as the proxemic cost map 140.

The use of the proxemic cost map 140 thus allows the robot 104 to move about the environment in a way that is more consistent with a user's expectations and improves safety of the use of the robot 104 around the user 102. Because the path planning module 148 is using the combined cost values to determine the path plan data 150, the path 152 in some situations may involve the traversal of an area that is designated as a high cost area by the proxemic cost map 140. For example, if the user 102 is sitting at a desk, the robot 104 is unable to approach from the user's 102 front as the desk is an obstacle 122 that the robot 104 is not able to traverse. Instead, the robot 104 may approach from one side or another, such as near the user's 102 right elbow.

In some implementations, the path planning module 148 may be part of, or used in conjunction with, an autonomous navigation module. For example, the autonomous navigation module may determine a current location of the robot 104 and determine an overall course that the robot 104 is to follow to perform the task, while the path planning module 148 handles a portion of that course that is proximate to the robot 104. Continuing the example, the path planning module 148 may be used to determine a course from the robot's 104 current location to a first waypoint elsewhere in the room that was determined by the autonomous navigation module. The autonomous navigation module is discussed in more detail with regard to FIG. 2.

The path 152 is representative of where the robot 104 is expected to go and may differ from an actual path followed by the robot 104. For example, appearance of an obstacle along the path 152 may result in the robot 104 determining new path plan data 150 indicative of a different path 152 around the obstacle.

The path planning module 148 may determine path plan data 150 at specified intervals, upon receipt of data indicative of a change, and so forth. For example, the path planning module 148 may determine path plan data 150 at a specified interval, such as every 200 ms, or every meter. Appearance of an obstacle 122 may result in determination of path plan data 150 outside of the specified interval.

In some implementations the path planning module 148 may generate a plurality of possible paths, and then score or rank those paths. A highest scoring path, deemed to be most suitable, may then be selected and used as the path plan data 150. For example, the ranking may be based on the sum of the combined values of the cells traversed by the possible path.

The path plan data 150 may be subsequently used to direct the movement of the robot 104. For example, the path plan data 150 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the robot 104 at a rate of 10.0 radians per second (rad/s) for 5 seconds and a second motor on a right side of the robot 104 at a rate of 9.7 rad/s for 5 seconds.

The path plan data 150 may comprise other data. In one implementation, the path plan data 150 may be a vector indicative of a direction and distance, expressed relative to the chassis of the robot 104. For example, the path plan data 150 may comprise a vector value indicative of a direction and a distance, such as +12 degrees and 1.72 meters. In another implementation, the path plan data 150 may comprise one or more waypoints that describe a location through or past which the robot 104 is to move. In yet another implementation the path plan data 150 may comprise a trajectory. For example, a set of coefficients may be used as inputs to an equation that describes a path along a plane or in space.

The motor controller may use the path plan data 150 to operate the motors of the robot 104 such that the robot 104 moves along the planned path 152. Continuing the example above, the motor controller may execute the instructions, resulting in the motors moving the robot 104.

The robot 104 may use the network interfaces 110 to connect to a network 154. For example, the network 154 may comprise a wireless local area network, that in turn is connected to a wide area network such as the Internet.

The robot 104 may be configured to dock or connect to a docking station 156. The docking station 156 may also be connected to the network 154. For example, the docking station 156 may be configured to connect to the wireless local area network such that the docking station 156 and the robot 104 may communicate. The docking station 156 may provide external power which the robot 104 may use to charge the battery 106.

The robot 104 may access one or more servers 158 via the network 154. For example, the robot 104 may utilize a wake word detection module to determine if the user 102 is addressing a request to the robot 104. The wake word detection module may hear a specified word or phrase and transition the robot 104 or portion thereof to the wake operating mode. Once in the wake mode, the robot 104 may then transfer at least a portion of the audio spoken by the user 102 to one or more servers 158 for further processing. The servers 158 may process the spoken audio and return to the robot 104 data that may be subsequently used to operate the robot 104.

The robot 104 may also communicate with other devices 160. The other devices 160 may include home automation controls, sensors, and so forth that are within the home or associated with operation of one or more devices in the home. For example, the other devices 160 may include a doorbell camera, a garage door, a refrigerator, washing machine, a network connected microphone, and so forth. In some implementations, the other devices 160 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
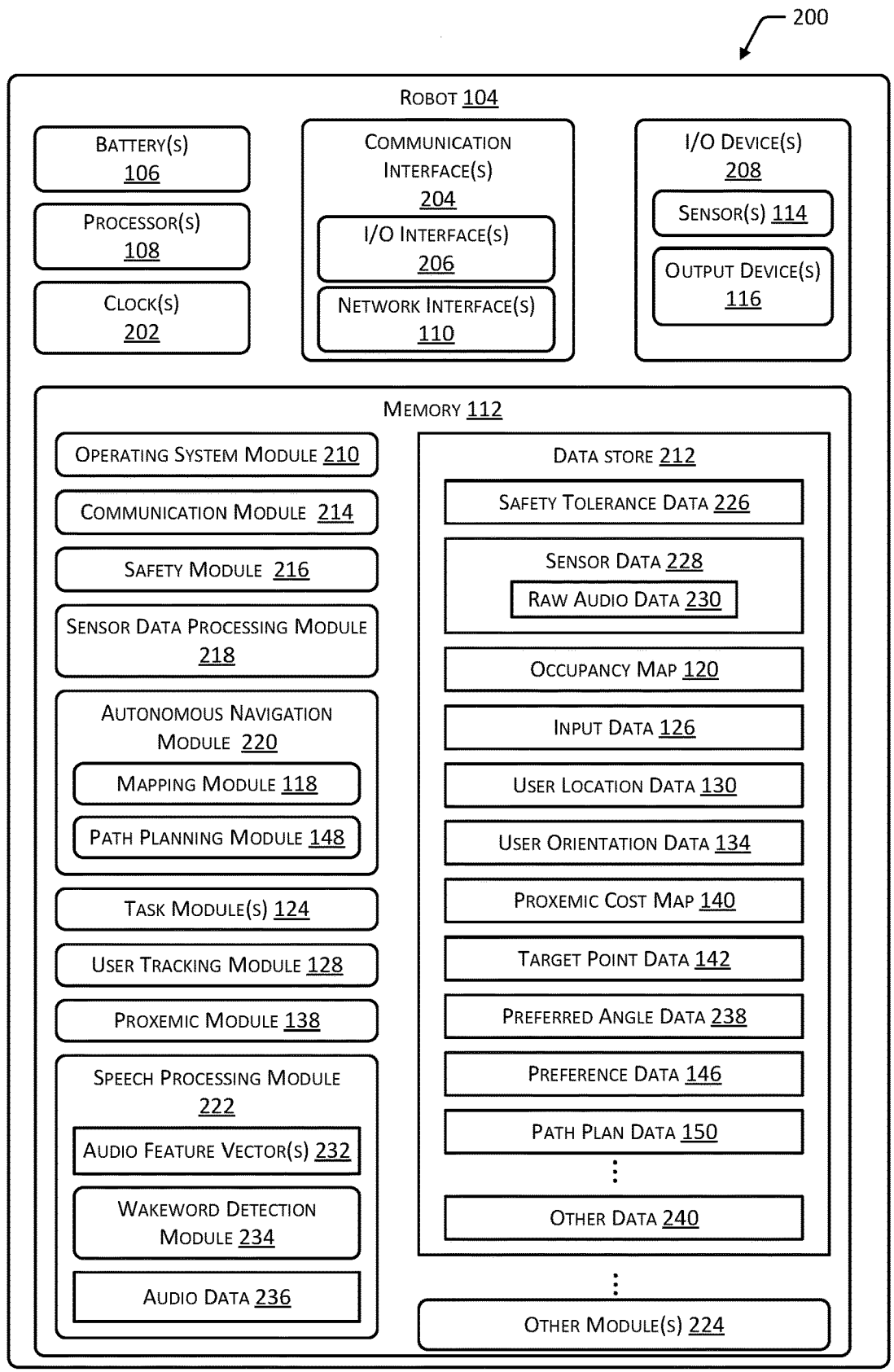
FIG. 2 is a block diagram of the components of the robot, according to some implementations.

FIG. 2 is a block diagram 200 of the robot 104, according to some implementations. The robot 104 may include one or more batteries 106 to provide electrical power suitable for operating the components in the robot 104. In some implementations other devices may be used to provide electrical power to the robot 104. For example, power may be provided by wireless power transfer, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signals processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 160 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 160 such as other robots 104, a docking station 156, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more buses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS).

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 160 including other robots 104, servers 158, network attached storage devices, and so forth.

A communication module 214 may be configured to establish communication with other devices 160, such as other robots 104, an external server 158, a docking station 156, and so forth. The communications may be authenticated, encrypted, and so forth.

Other modules within the memory 112 may include a safety module 216, a sensor data processing module 218, an autonomous navigation module 220, the one or more task modules 124, the path planning module 148, a speech processing module 222, or other modules 224. The modules may access data stored within the data store 212, such as safety tolerance data 226, sensor data 228, or other data 240.

The safety module 216 may access safety tolerance data 226 to determine within what tolerances the robot 104 may operate safely within the physical environment. For example, the safety module 216 may be configured to stop the robot 104 from moving when the extensible mast is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 may maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more of the motors, and so forth. The safety module 216 may be implemented as hardware, software, or a combination thereof.

The safety module 216 may control other factors, such as a maximum speed of the robot 104 based on information obtained by the sensors 114, precision and accuracy of the sensor data 228, and so forth. For example, detection of an object by an optical sensor may include some error, such as when the distance to an object comprises a weighted average between the object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 228 that is acquired from one or more sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 240. For example, the ANN may be trained using a supervised learning algorithm such that object identifiers are associated with images of particular objects within training images provided to the ANN. Once trained, the ANN may be provided with the sensor data 228 and produce output indicative of the object identifier.

The autonomous navigation module 220 provides the robot 104 with the ability to navigate within the physical environment without real-time human interaction. The autonomous navigation module 220 may implement, or operate in conjunction with, the mapping module 118 to determine the occupancy map 120 or other representation of the physical environment. In one implementation, the mapping module 118 may use one or more simultaneous localization and mapping ("SLAM") techniques. The SLAM algorithms may utilize one or more of maps, algorithms, beacons, or other techniques to provide navigational data. The navigational data may then be used to determine the path plan data 150 which is then subsequently used to determine a set of commands that drive the motors connected to the wheels. For example, the autonomous navigation module 220 may determine a location with the environment, estimate a path to a destination, and so forth.

In some implementations, the path planning module 148 may be part of, or operate in conjunction with, the autonomous navigation module 220. During operation, the autonomous navigation module 220 may use the proxemic cost map 140, target point data 142, preference data 146, and so forth to determine the path plan data 150. As described above, the proxemic module 138 may determine the target point data 142, the proxemic cost map 140, and so forth. The path planning module 148 may be configured to determine a lowest cost path from a plurality of possible paths, based on the combined values of the occupancy map 120, the proxemic cost map 140, and so forth.

The proxemic module 138 may determine the target point data 142 based on information such as the occupancy map 120, preferred angle data 238, preference data 146, and so forth. For example, the target point 144 may be selected in an area that is indicated by the occupancy map 120 as being unobstructed. The preferred angle data 238 comprises data indicative of a preferred angle, such as with respect to the user orientation 136, within which the target point 144 may be placed. For example, the preferred angle data 238 may specify that the target point 144 may be located in an angle extending from 45 degrees to the left of the user's orientation 136 and 45 degrees to the right of the user's orientation 136.

The autonomous navigation module 220 may include an obstacle avoidance module. For example, if an obstacle 122 is detected along a planned path, the obstacle avoidance module may re-route the robot 104 to move around the obstacle 122 or take an alternate path.

The autonomous navigation module 220 may utilize various techniques during processing of sensor data 228. For example, image data obtained from cameras on the robot 104 may be processed to determine one or more of corners, edges, planes, and so forth. In some implementations, corners may be detected and the coordinates of those corners may be used to produce point cloud data.

The occupancy map 120 may be manually or automatically determined. For example, during a learning phase the user 102 may take the robot 104 on a tour of the environment, allowing the robot 104 to generate the occupancy map 120 and associated data, such as tags indicating designating a particular room, such as "kitchen" or "bedroom". In another example, during subsequent operation the robot 104 may generate the occupancy map 120 that is indicative of locations of obstacles such as chairs, doors, stairwells, and so forth as it moves unattended through the environment.

In some implementations, the occupancy map 120 may include floor characterization data. The floor characterization data is indicative of one or more attributes of the floor at a particular location within the physical environment. During operation of the robot 104, floor characterization data may be obtained. The floor characterization data may be utilized by one or more of safety module 216, the autonomous navigation module 220, the task module 124, or other modules 224. For example, the floor characterization data may be used to determine if an unsafe condition occurs such as a wet floor. In another example, the floor characterization data may be used by the autonomous navigation module 220 to assist in the determination of the current location of the robot 104 within the home. For example, if the autonomous navigation module 220 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 156 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user 102 "what room is this?" during a training phase. The utterance of the user may be received by the microphone array and the audio data "this is the living room" may be processed and subsequently used to generate the location designator.

The autonomous navigation module 220 may be used to move the robot 104 from a first location to a second location within the physical environment. This movement may be responsive to a determination made by an onboard processor 108, in response to a command received via one or more communication interfaces 204 or a sensor 114, and so forth. For example, an external server 158 may send a command that is subsequently received using a network interface 110. This command may direct the robot 104 to proceed to a designated destination, such as "living room" or "dining room". The robot 104 may then process this command, and use the autonomous navigation module 220 to determine the directions and distances associated with reaching the specified destination.

The memory 112 may store one or more task modules 124. The task module 124 comprises instructions that, when executed, provide one or more functions associated with a particular task. A task may have one or more behaviors associated with it. The behaviors may then result in the use of particular proxemic cost maps 140, preferred angles, interaction distances, and so forth. For example, a task that involves the user 102 entering data on a touchscreen of the robot 104 may have an interaction distance of 0.5 meters.

Interactions may involve a single behavior. In one example, the task may comprise a security or sentry task in which the robot 104 travels throughout the physical environment avoiding users 102 and looking for events that exceed predetermined thresholds. Continuing the example, if the robot 104 detects that the ambient temperature is below a minimum level, or that water is present on the floor, or detects sound of broken glass, an alert may be generated. The alert may be given as an audible, visual, or electronic notification. For example, the electronic notification may involve the robot 104 transmitting data using one or more of the communication interfaces 204.

In another example, the task may comprise a "follow me" feature in which the robot 104 follows a user 102 using a follow behavior. For example, the user 102 may participate in a video call using the robot 104. The camera on the mast may be used to acquire video for transmission while the display is used to present video that is received. The robot 104 may use data from one or more sensors 114 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102. The path 152 of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone on the robot 104, a microphone in a smart phone, or another device with a microphone such as a network enabled speaker or television. While performing this task, the robot 104 may utilize an avoid behavior until it reaches the particular location.

Alternatively, the user 102 may issue a command using an app on a smartphone, wearable device, tablet, or other computing device. Given that the location of the device at which the command was obtained is known, the robot 104 may be dispatched to that location. If the location is unknown, the robot 104 may search for the particular user 102, utilizing an avoid behavior with respect to other users and an approach behavior for the particular user 102.

The speech processing module 222 may be used to process utterances of the user 102. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 154 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user 102 intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 158 for speech processing. The audio data 236 corresponding to audio obtained by the microphone may be sent to a server 158 for routing to a recipient device or may be sent to the server 158 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 154 using one or more of the network interfaces 110. One or more servers 158 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, a task module 124, and so forth. In one implementation, the text string may be sent via a network 154 to a server 158 for further processing. The robot 104 may receive a response from the server 158 and present output, perform an action, and so forth. For example, the raw audio data 230 may include the user saying, "robot, go to the dining room". The audio data 236 representative of this utterance may be sent to the server 158 that returns commands directing the robot 104 to the dining room of the home associated with the robot 104.

The utterance may result in a response from the server 158 that directs operation of other devices 160 or services. For example, the user 102 may say "robot, wake me at seven tomorrow morning". The audio data 236 may be sent to the server 158 that determines the intent and generates commands to instruct a device attached to the network 154 to play an alarm at 7:00 am the next day.

The other modules 224 may comprise a speech synthesis module that is able to convert text data to human speech. For example, the speech synthesis module may be used by the robot 104 to provide speech that a user 102 is able to understand.

Preferred angle data 238 may also be stored in the data store 212. The preferred angle data 238 may indicate the angle, with respect to the user orientation 136, within which the target point 144 is permitted. For example, the preferred angle data 238 may indicate that target point 144 may be placed between 45 degrees to either side of the user orientation 136.

The data store 212 may store other data 240 such as localization settings.

Figure 3:
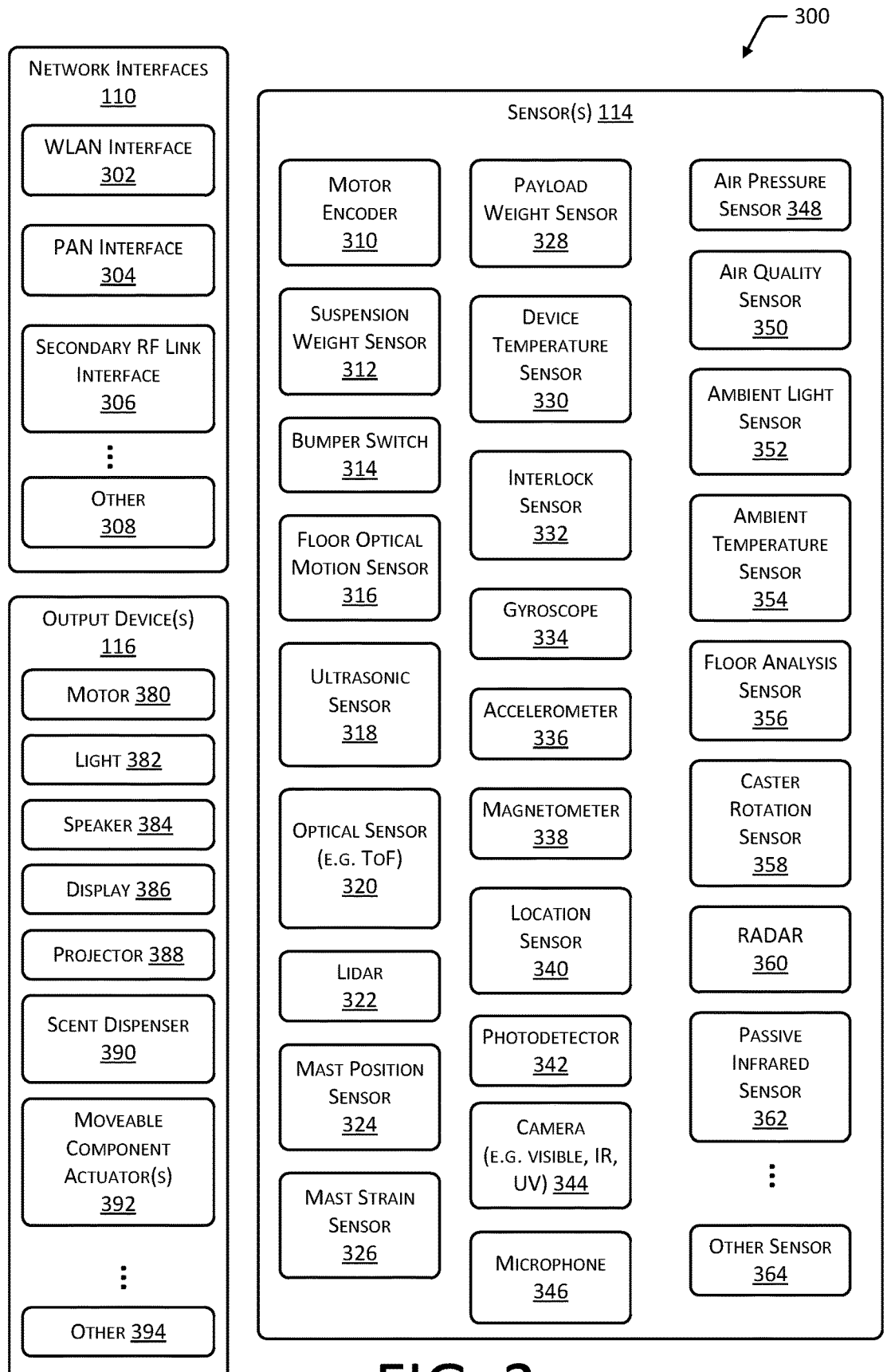
FIG. 3 is a block diagram of some components of the robot such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured. One of more of the sensors 114, output devices 116, or a combination thereof may be included on a moveable component that may be panned, tilted, rotated, or any combination thereof with respect to a chassis of the robot 104.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 160 in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 156, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood other sensors 114 may be included or utilized by the robot 104, while some sensors 114 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 220 may utilize the data from the motor encoder 310 to estimate a distance traveled.

A suspension weight sensor 312 provides information indicative of the weight of the robot 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 380. For example, if the suspension weight sensor 312 indicates no weight on the suspension, the implication is that the robot 104 is no longer resting on its wheels, and thus operation of the motors 380 may be inhibited. In another example, if the suspension weight sensor 312 indicates weight that exceeds a threshold value, the implication is that something heavy is resting on the robot 104 and thus operation of the motors 380 may be inhibited.

One or more bumper switches 314 provide an indication of physical contact between a bumper or other member that is in mechanical contact with the bumper switch 314. Safety module 216 utilizes sensor data 228 obtained by the bumper switches 314 to modify the operation of the robot 104. For example, if the bumper switch 314 associated with a front of the robot 104 is triggered, the safety module 216 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is an ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment.

A mast position sensor 324 provides information indicative of a position of the mast. For example, the mast position sensor 324 may comprise limit switches associated with the mast extension mechanism that indicate whether the mast is in an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the robot 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the robot 104. For example, the mast strain sensor 326 may comprise a strain gauge or load cell that measures a side-load applied to the mast, a weight on the mast, or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the robot 104.

A payload weight sensor 328 provides information indicative of the weight associated with a modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more of the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 and the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more location sensors 340. The location sensors 340 may comprise an optical, radio, or other navigational system such as a global positioning system (GPS) receiver. For indoor operation, the location sensors 340 may comprise indoor position systems, such as using a Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera 344 that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts. One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 220, the task module 124, and so forth. For example, if the floor analysis sensor 356 determines that the floor is wet, the safety module 216 may decrease the speed of the robot 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 804 transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical environment to provide landmarks for the autonomous navigation module 220. One or more touch sensors may be utilized to determine contact with a user 102 or other objects.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the robot 104 may include a haptic output device that provides output that produces particular touch sensations to the user 102. Continuing the example, a motor 380 with an eccentric weight may be used to create a buzz or vibration to allow the robot 104 to simulate the purr of a cat.

Figure 4:
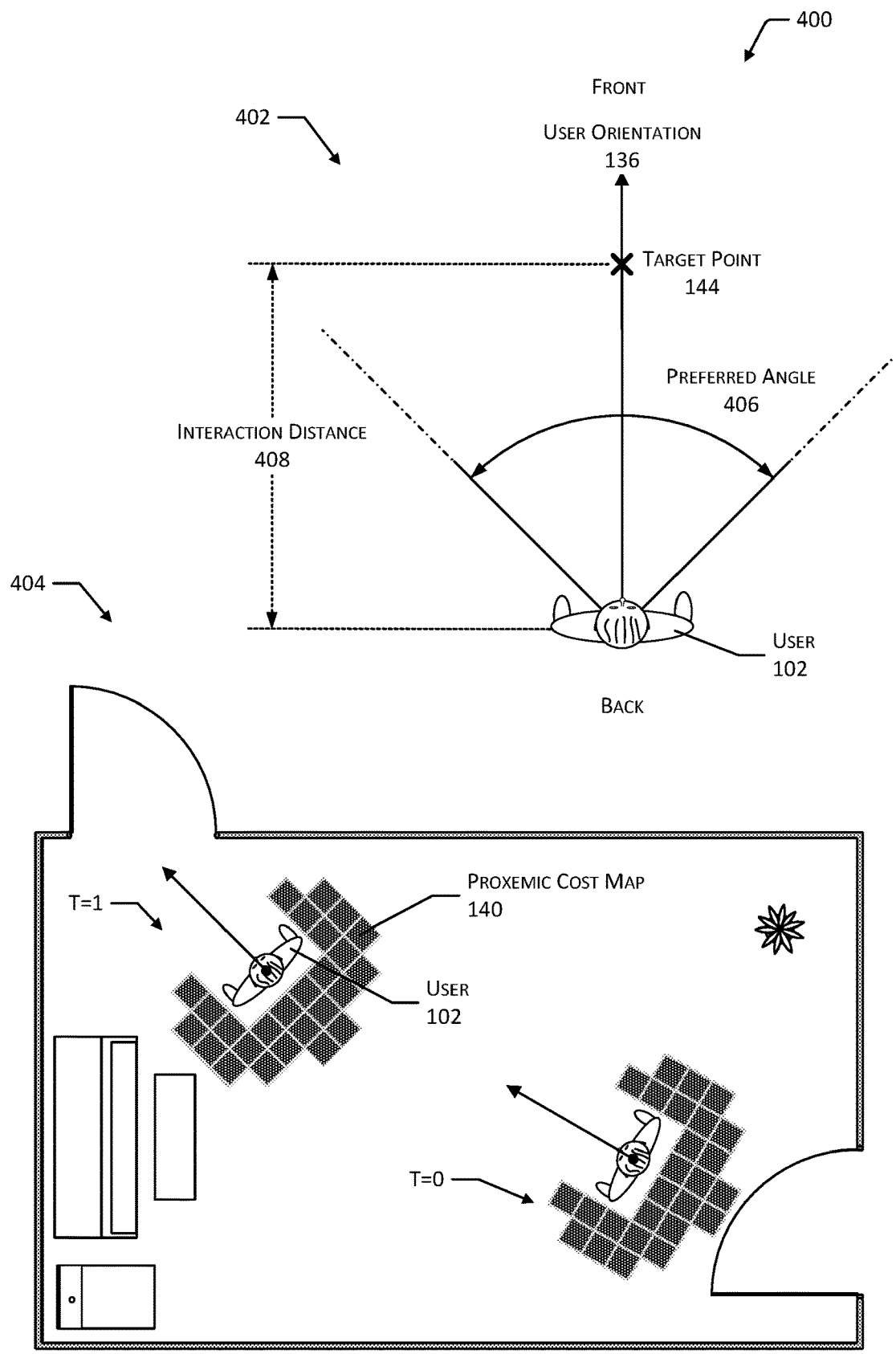
FIG. 4 illustrates placement of a target point with respect to the user and a proxemic cost map that is associated with a user, according to some implementations.

At 400 FIG. 4 illustrates placement 402 of a target point 144 with respect to the user 102 and movement 404 of the proxemic cost map 140 that is associated with a user 102, according to some implementations.

At 402 the user 102 is depicted with the user orientation 136. In this example, the user orientation 136 is shown extending away from a front of the user 102 in a line that is perpendicular to a line through the shoulders of the user 102. In other implementations, the user orientation 136 used by the system 100 may be expressed in other directions with respect to the user 102.

During operation, the proxemic module 138 may access the preferred angle data 238. The preferred angle data 238 is indicative of the preferred angle 406 within which the target point 144 may be located. The preferred angle data 238 may provide different preferred angles 406 for a particular user 102, groups of users 102, task, behavior, and so forth. For example, the preferred angle data 238 may indicate that for approach behavior the preferred angle 406 extends between 45 degrees to either side of the user orientation 136. In another example, for follow behavior the preferred angle data 238 may indicate a preferred angle 406 that extends from 100 to 135 degrees with respect to the user orientation 136.

In some situations, the proxemic module 138 may select a target point 144 that is outside of the preferred angle 406. For example, if the occupancy map 120 for the location indicated by the target point 144 corresponds to an obstacle 122, the target point 144 may be placed at a location that is free of an obstacle 122. In other implementations, several different preferred angles 406 may be specified in a hierarchical structure. For example, a first preferred angle 406 may be used, but if not suitable due to the presence of an obstacle 122, a second preferred angle 406 that describes a different angular range may be used.

The target point 144 is located at an interaction distance 408 from the user 102. For example, the interaction distance 408 may extend from a geometric centroid of the user 102 to the target point 144. The interaction distance 408 may vary for a particular user 102, groups of users 102, task, behavior, and so forth. For example, the Interaction distance 408 for a task that involves the user 102 touching the robot 104 may have an interaction distance 408 that is less than a task of presenting a video call. In some implementations the proxemic module 138 may use an interaction distance 408 that avoids placement of the target point 144 within an obstacle 122. For example, if the default interaction distance 408 is 1.5 m, and there is a wall at 1.2 m, the proxemic module 138 may set the interaction distance 408 to 1 m.

As described above, if the target point 144 within the preferred angle 406 is coexistent with an obstacle such as indicated by the occupancy map 120, proposed target points 144 at different locations may be tested. For example, if a first proposed target point 144 coincides with an obstacle 122 as indicated by the occupancy map 120, a second proposed target point 144 at a second location may be tested. The proposed target points 144 may be tested along an arc that is at the interaction distance 408 from the user 102. For example, if the first proposed target point 144 directly in front of the user 102 is unavailable because of an obstacle 122, a second target point 144 that is 5 degrees to the right of the user orientation 136 may be tested. If that is unavailable, a third target point 144 that is 10 degrees to the right of the user orientation 136 may be tested.

As depicted at 404, the proxemic cost map 140 may be considered to move with the user 102 as they move within the environment. For example, as the user 102 moves through the room in the environment from a first location at time t=0 to a second location at time t=1, the proxemic cost map 140 moves with them. The placement of the proxemic cost map 140 may be based on the user location data 130 and in some implementations one or more of the user orientation data 134 or the target point data 142. For example, if the cost values in the proxemic cost map 140 are radially asymmetrical, then the orientation of the proxemic cost map 140 is significant. Continuing the example, if the proxemic cost map 140 specifies cells with low cost values in front of the user 102, then those cells with low cost values should remain in front of the user 102, even as the user turns or otherwise moves in the environment.

In some implementations, parameters such as the proxemic cost map used 604, the preferred angle 406, the interaction distance 408, and so forth may be changed based at least in part on user input. The user input that is representative of a change to these parameters may be obtained either explicitly or implicitly. For example, explicit input about the interaction distance 408 may involve a user ordering the robot to "come closer" or "move back", or specifying a particular distance. In another example, implicit input may involve the user 102 changing their position with respect to the robot 104, such as stepping towards the robot 104, moving away from the robot 104, turning towards the robot 104, and so forth. Responsive to this implicit user input, the robot 104 may move to a different interaction distance 408. The interaction distance 408 used may be stored for future use.

In some implementations, the proxemic module 138 may truncate the proxemic cost map 140 if it coincides with an obstacle 122 as indicated by the occupancy map 120. For example, if the user 102 is with their back to the wall 122(2), the proxemic cost map 140 may describe the areas in front of the user 102 that are not coincident with or blocked by the wall 122(2).

Figure 5:
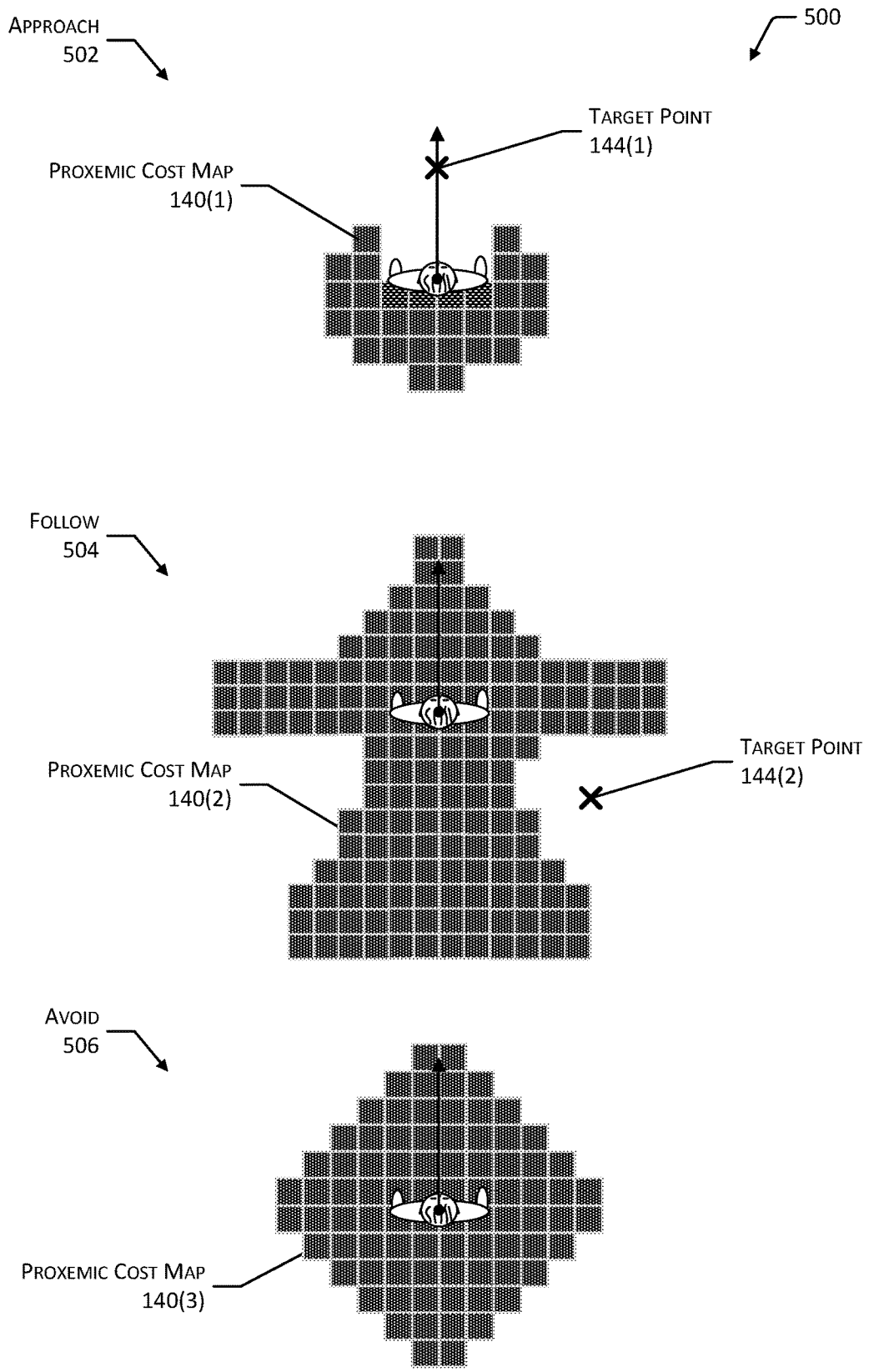
FIG. 5 illustrates proxemic cost maps associated with particular behaviors, according to some implementations.

FIG. 5 at 500 illustrates proxemic cost maps 140 associated with particular behaviors, according to some implementations. In this illustration, darker shading indicates cells on the proxemic cost map 140 that exhibit a relatively large cost value.

At 502 a proxemic cost map 140(1) that may be associated with an approach behavior is shown. The proxemic cost map 140(1) provides a relatively low cost region in front of the user 102 through which the robot 104 may be preferred to traverse while approaching the user 102. The relatively high cost regions extend in a "U" or horseshoe shape around the back of the user 102, with the location of the user 102 being within a bend of the "U". As a result, with respect to the costs indicated by the proxemic cost map 140(1), the cost for a path 152 that traverses this area behind the user 102 would be higher than a path 152 that traverses an area in front of the user 102. The target point 144(1) is shown within the preferred angle 406 associated with the approach behavior.

The proxemic cost map 140(1) may be described as comprising two groups of one or more cells, with each cell corresponding to an area in the physical environment. A first group of one or more cells may extend in a first arcuate area, curving from a first angle relative to the orientation of the user 136 to a second angle relative to the orientation of the user 136. For example, the first group of one or more cells may describe a set of cells that curve around in front of the user 102.

A second group of one or more cells may extend in a second arcuate area from the second angle relative to the orientation of the user 136 to the first angle relative to the orientation of the user 136. For example, the second group of one or more cells may describe a set of cells that curve around behind the user 102 and partially to each side, as depicted by the shaded cells in this illustration.

The values of the proxemic cost map 140(1) encourage the robot 104 to find a path 152 that brings the robot 104 to the target point 144(1) while avoiding the user's 102 blind spot or the area near the user's elbows. For example, a first sum of the cell values of the first group of one or more cells is less than a second sum of the cell values of the second group of one or more cells.

At 504 a proxemic cost map 140(2) that may be associated with a follow behavior is shown. This proxemic cost map 140(2) includes relatively high cost regions in front of the user 102, behind the user 102 and laterally to either side of the user 102. The target point 144(2) associated with the follow behavior is to either the left or right and abaft of the user 102. The proxemic cost map 140(2) as illustrated is configured to prevent the robot 104 from following the user 102 directly behind, immediately to the side, or directly ahead to prevent collision if the user 102 should change direction.

At 506 a proxemic cost map 140(3) that may be associated with an avoid behavior is shown. This proxemic cost map 140(3) includes relatively high cost regions that surround the user 102. No target point 144 is present as the robot 104 is not being directed to move to a position proximate to the user 102.

The various shapes of the proxemic cost maps 140 are depicted here for illustration and not necessarily as limitations. For example, other arrangements of proxemic cost maps 140 and their associated cost values may be used. Additionally, other behaviors may have proxemic cost maps 140 associated with them.

FIG. 6 illustrates a table 600 associating tasks with their proxemic cost maps 140, preferred angles 406, and interaction distances 408, according to some implementations. The table 600 is shown for illustration, and not necessarily as a limitation. For example, the data may be stored in other data structures including linked lists, executable code, and so forth. In some implementations the data included in the table 600 may be stored in the preference data 146.

The table 600 includes tasks 602 and the associated proxemic cost map used 604, the preferred angle 406, and interaction distance 408 for each task 602. In other implementations, other data may be included, such as a maximum velocity for a particular behavior.

During operation, the proxemic module 138 may use the data presented in the table 600 to determine, for a particular task 602, the proxemic cost map to be used 604, and the preferred angle 406. For example, for the task 602 "present incoming video call" the proxemic cost map used 604 may be that suitable for an approach behavior, such as described at 502. The target point 144 used for this task should be within the preferred angle 406 of ±45 degrees of the user's orientation 136 and have an interaction distance 408 of 1.5 m. As described above, in some implementations the actual location of the target point 144 may vary based on other factors. For example, an indication by the occupancy map 120 that an obstacle 122 is present within an arc described by the preferred angle 406 and the interaction distance 408 may result in one or more of changing the interaction distance 408 or placing the target point 144 outside of the preferred angle 406.

In some implementations, the determination of the target point 144 may be based at least in part on the cost values of the proxemic cost map 140. In other implementations, one or more default target points 144 may be associated with the proxemic cost map 140. These default target points 144 may be hierarchically ranked, such that if one target point 144 is unavailable then the next ranked default target point 144 would be used. For example, the first default target point 144 for the "present incoming video call" is located at 1.5 m along the user orientation 136. If there is an obstacle 122 present at this location, then a second default target point 144 located at 25 degrees to the right of the user orientation 136 and at a distance of 1.0 m may be used.

Some tasks 602 may involve the use of multiple behaviors. For example, the "find specified user" task 602 involves the robot 104 searching the environment to determine the location of a particular user 102. During the search portion of the task 602, the robot 104 may utilize an avoid behavior, and the associated proxemic cost map that is used 604 is that depicted at 506. With this behavior, the path 152 of the robot 104 will tend to be away from the other users 102 in the environment. When the particular user 102 is located, the behavior may change to an approach behavior, and the proxemic cost map 140 depicted at 502 may be used.

Figure 7:
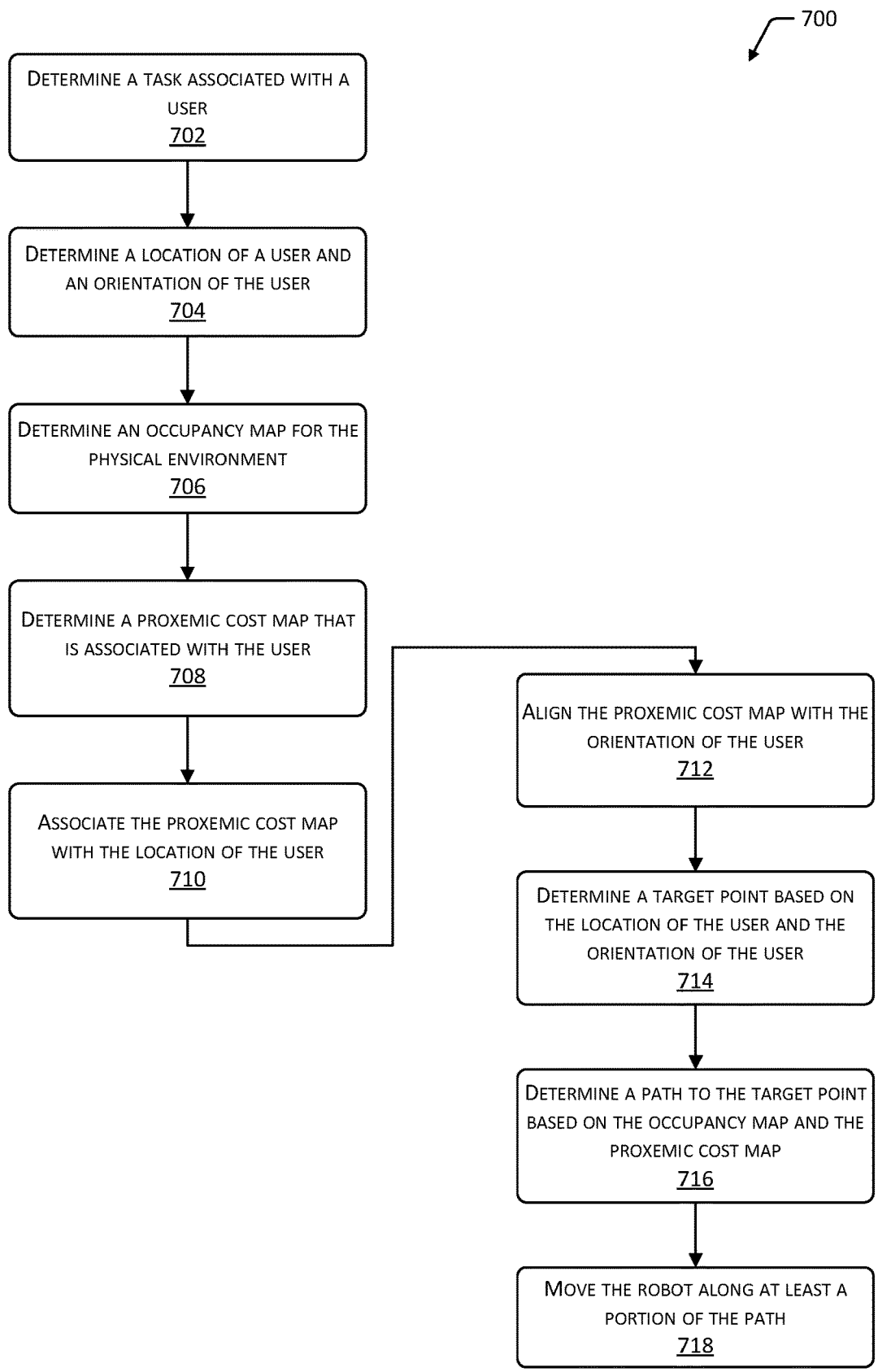
FIG. 7 is a flow diagram of a process to dynamically position the robot with respect to a user, according to some implementations.

FIG. 7 is a flow diagram 700 of a process to dynamically position an autonomous mobile device such as a robot 104 with respect to a user 102, according to some implementations. The process may be implemented at least in part by one or more of the processors 108 on the robot 104, the servers 158, the docking station 156, or other devices 160.

At 702 a task 602 is determined that is associated with a user 102. For example, an incoming video call may be received for the robot 104 to present to the user 102.

At 704 a location and orientation of the user 102 are determined. For example, the robot 104 may use data from the sensors 114 to determine the user location data 130 indicative of the user location 132. Data from the sensors 114 may also be used to determine the user orientation data 134 indicative of the user orientation 136.

At 706 an occupancy map 120 for at least a portion of the environment is determined. The occupancy map 120 may be indicative of placement of one or more of an object in or an aspect of an area that impedes movement of the robot 104 in the physical environment. In one implementation, the occupancy map 120 comprises a plurality of cells with each cell of the plurality of cells representing a particular area in the physical environment and having an obstacle cost value that is indicative of whether the cell is able to be traversed by the robot 104.

At 708 a proxemic cost map 140 is determined. As described with regard to FIG. 6, a particular proxemic cost map 140 may be selected based on the task 602 to be performed. For example, the proxemic cost map 140 to be used may be retrieved from the table 600 based on the task 602. The proxemic cost map 140 may comprise a plurality of cells with each cell of the plurality of cells representative of a particular area in a physical environment. A cell value for each of the cells is representative of a cost associated with traversal of the cell by a robot 104.

In other implementations, the proxemic cost map 140 for use may be selected based at least in part on identity of the user 102, location within the environment, and so forth. For example, a particular user 102 may have a preferred proxemic cost map 140. In another example, within the room designated as "kitchen", the overall size of the high cost areas indicated by the proxemic cost map 140 for that room may be larger, keeping the robot 104 at a greater distance to further minimize inadvertent collisions.

At 710 the proxemic cost map 140 is associated with the user location 132 indicated by the user location data 130. For example, the proxemic cost map 140 may be centered on the user location 132. In another example, another point within the proxemic cost map 140 may be associated with the user location 132.

At 712 the proxemic cost map 140 may be aligned with, or have an orientation that is otherwise based at least in part on, the user orientation 136 indicated by the user orientation data 134. In some implementations the proxemic cost map 140 is asymmetrical along at least one axis. For example, the proxemic cost values for cells in front of the user 102 may be lower than the proxemic cost values of the cells that are behind the user 102. In one implementation, the alignment of the proxemic cost map 140 may comprise rotating the proxemic cost map 140 based on the user orientation data 134. For example, if the user 102 has user orientation data 134 indicative of a heading of 47 degrees, the proxemic cost map 140 may be rotated to 47 degrees.

At 714 a target point 144 is determined. In one implementation, the target point data 142 may be determined based on the user location data 130 and the user orientation data 134 of the user. In another implementation, the target point 144 may be predetermined and associated with the proxemic cost map 140.

At 716 path plan data 150 indicative of a path 152 to the target point 144 is determined. In one implementation, the path planning module 148 may use the occupancy map 120, the proxemic cost map 140, and other data to determine the costs of various possible paths from a current location of the robot 104 to the target point 144. The possible path that exhibits the lowest cost may be selected to be used to generate the path plan data 150 indicative of the path 152.

At 718 the robot 104 is moved along at least a portion of the path 152 as described by the path plan data 150.

Figure 8:
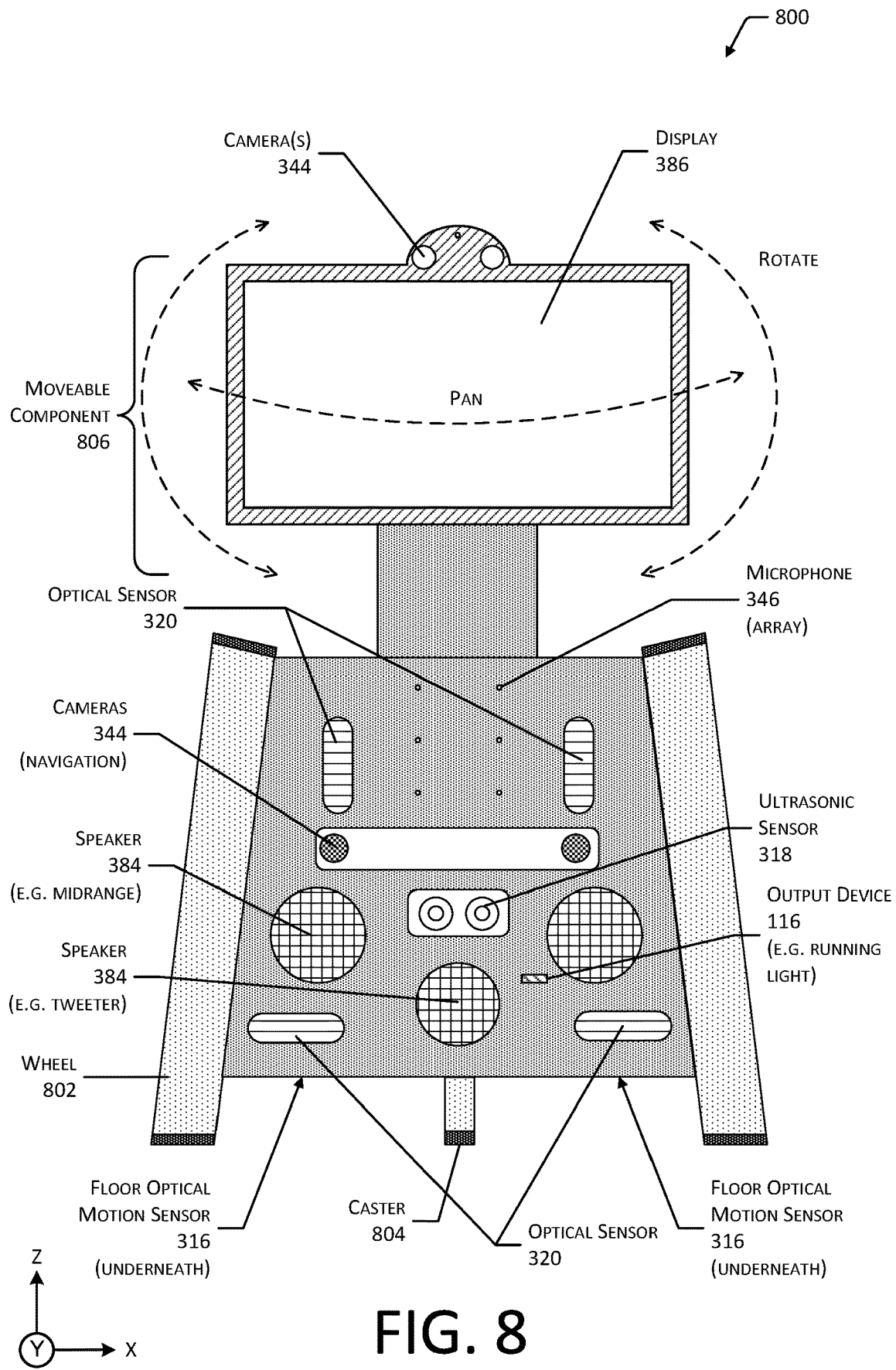
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users or pets that may be in the path 152 of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

The robot 104 may comprise a moveable component 806. In one implementation, the moveable component 806 may include the display 386 and cameras 344 arranged above the display 386. The cameras 344 may operate to provide stereo image data of the physical environment, the user 102, and so forth. For example, an image from each of the cameras 344 above the display 386 may be accessed and used to generate stereo image data about a face of a user 102. This stereo image data may then be used for facial recognition, user identification, gesture recognition, gaze tracking, and so forth. In other implementations, a single camera 344 may be present above the display 386.

The moveable component 806 is mounted on a moveable mount that allows for movement with respect to the chassis of the robot 104. The movable mount may allow the moveable component 806 to be moved by the moveable component actuators 392 along one or more degrees of freedom. For example, the moveable component 806 may pan, tilt, and rotate as depicted here. The size of the moveable component 806 may vary. In one implementation, the display 386 in the moveable component 806 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 are located on an underside of the robot 104.

Figure 9:
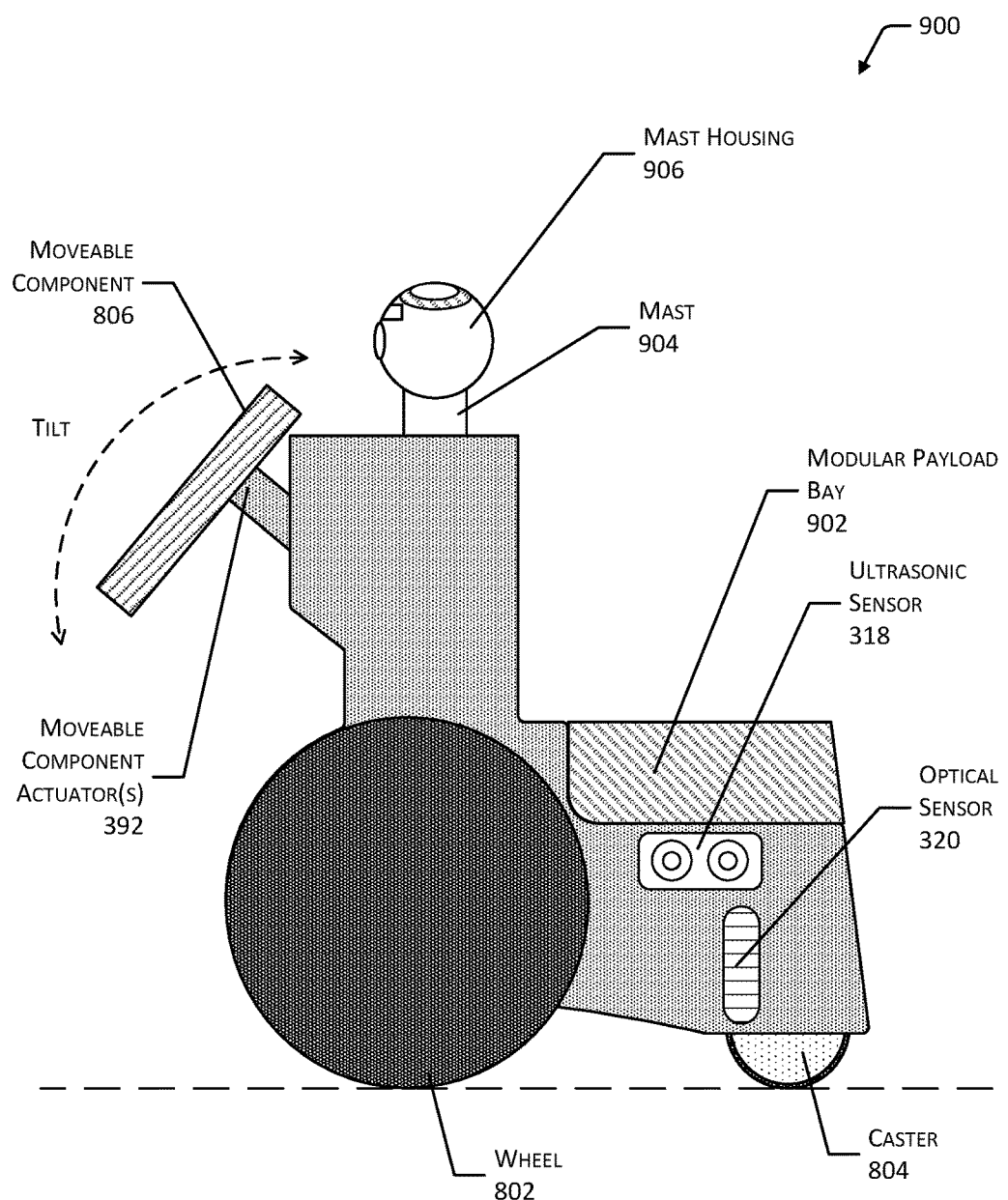
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact deforms but then over time returns to the original shape.

In this side view, the left side of the robot 104 is depicted. An ultrasonic sensor 318 and an optical sensor 320 are present on either side of the robot 104.

In this illustration, the caster 804 is shown in a trailing configuration, in which the caster 804 is located behind or abaft of the axle of the wheels 802. In another implementation (not shown), the caster 804 may be in front of the axle of the wheels 802. For example, the caster 804 may be a leading caster 804 positioned forward of the axle of the wheels 802.

The robot 104 may include a modular payload bay 902 located within the lower structure. The modular payload bay 902 provides one or more of mechanical or electrical connectivity with robot 104. For example, a modular payload bay 902 may include one or more engagement features such as slots, cams, ridges, magnets, bolts, and so forth that are used to mechanically secure an accessory within the modular payload bay 902. In one implementation, the modular payload bay 902 may comprise walls within which the accessory may sit. In another implementation, the modular payload bay 902 may include other mechanical engagement features such as slots into which the accessory may be slid and engaged.

The modular payload bay 902 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 806 that includes a display 386 which may be utilized to present visual information to the user 102. In some implementations, the moveable component 806 may be located with or affixed to the upper structure. In some implementations, the display 386 may comprise a touch screen that allows user input to be acquired. The moveable component 806 is mounted on a movable mount that allows motion along one or more axes. For example, the movable mount may allow the moveable component 806 to be panned, tilted, and rotated by the moveable component actuators 392. The moveable component 806 may be moved to provide a desired viewing angle to the user 102, to provide output from the robot 104, and so forth. For example, the output may comprise the moveable component 806 being tilted forward and backward to provide a gestural output equivalent to a human nodding their head, or panning to face the target point 144 as described above.

The robot 104 may incorporate a mast 904. The mast 904 provides a location from which additional sensors 114 or output devices 116 may be placed at a higher vantage point. The mast 904 may be fixed or extensible. The extensible mast 904 is depicted in this illustration. The extensible mast 904 may be transitioned between a retracted state, an extended state, or placed at some intermediate value between the two.

At the top of the mast 904 may be a mast housing 906. In this illustration, the mast housing 906 is approximately spherical, however in other implementations other physical form factors such as cylinders, squares, or other shapes may be utilized.

The mast housing 906 may contain one or more sensors 114. For example, the sensors 114 may include a camera 344 having a field-of-view (FOV). In another example, the sensors 114 may include an optical sensor 320 to determine a distance to an object. The optical sensor 320 may look upward, and may provide information as to whether there is sufficient clearance above the robot 104 to deploy the mast 904. In another example, the mast housing 906 may include one or more microphones 346.

One or more output devices 116 may also be contained by the mast housing 906. For example, the output devices 116 may include a camera flash used to provide illumination for the camera 344, and an indicator light 382 that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output devices 116, or the mast housing 906 may be movable. For example, the motor 380 may allow for the mast 904, the mast housing 906, or a combination thereof to be panned allowing the FOV to move from left to right.

In some implementations, the moveable component 806 may be mounted to the mast 904. For example, the moveable component 806 may be affixed to the mast housing 906. In another example, the moveable component 806 may be mounted to a portion of the mast 904, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining a task that is associated with a user;
   determining a user identifier associated with the user;
   determining a location of the user;
   determining an orientation of the user;
   determining, based on the task, a proxemic cost map that is associated with the user identifier, the proxemic cost map represents a plurality of areas in a physical environment with respect to the location of the user and at least in part on the orientation of the user, wherein a proxemic cost value for each area is representative of a cost associated with traversal of the area by a robot;
   aligning the proxemic cost map based on the orientation of the user;
   determining an occupancy map indicative of placement of one or more obstacles in the physical environment that impede movement of the robot in the physical environment, wherein the occupancy map is indicative of the plurality of areas within the physical environment and further wherein each of the plurality of areas has an obstacle cost value that is indicative of whether each of the plurality of areas includes an obstacle;
   determining a target point;
   determining a first path and a second path from a first point to the target point;
   determining, based on the proxemic cost value and obstacle cost value of each of the areas traversed by the first path, a first path score;
   determining, based on the proxemic cost value and obstacle cost value of each of the areas traversed by the second path, a second path score;
   determining that the first path score is lower than the second path score; and
   moving the robot along at least a portion of the first path.

2. The method of claim 1, wherein the proxemic cost map comprises:
   a first area that is in front of the user and extends from a first angle relative to the orientation of the user to a second angle relative to the orientation of the user;
   a second area that is behind the user and extends from the second angle relative to the orientation of the user to the first angle relative to the orientation of the user; and
   wherein a first sum of proxemic cost values of areas within the first area is less than a second sum of the proxemic cost values of areas within the second area.

3. The method of claim 1, further comprising:
   determining, based at least in part on the task, a first distance from the user; and
   wherein the target point is located at the first distance.

4. The method of claim 1, further comprising:
determining the robot is at the target point;
determining that the user has moved to a second location different from the location;
determining that a distance between the location and the second location exceeds a threshold value;
determining a second distance from the second location;
determining a second target point based at least in part on the second distance; and
moving the robot to the second target point.

5. The method of claim 1, further comprising:
determining the robot is at the target point;
determining user input that is representative of a first distance between the user and the robot; and
moving the robot to a second location that is at the first distance.

6. The method of claim 1, the determining the orientation of the user further comprising:
acquiring one or more images of a user's head; and
determining, based on the one or more images, a direction of a line that is perpendicular to a line extending through both eyes of the user.

7. The method of claim 1, the determining the target point comprising:
determining a first score of a first area by summing a first obstacle cost value associated with the first area and a first proxemic cost value associated with the first area;
determining a second score of a second area by summing a second obstacle cost value associated with the second area and a second proxemic cost value associated with the second area;
determining the first score is less than the second score; and
designating the target point as within the first area.

8. A method comprising:
determining a location of a user;
determining a proxemic cost map that represents a plurality of areas in a physical environment with respect to the location of the user and an orientation of the user, wherein a proxemic cost value for each area is representative of a cost associated with traversal of the area by a robot;
associating the proxemic cost map with the location of the user;
determining a first score of a first area by summing a first obstacle cost value associated with the first area and a first proxemic cost value associated with the first area;
determining a second score of a second area by summing a second obstacle cost value associated with the second area and a second proxemic cost value associated with the second area;
determining the first score is less than the second score;
determining a target point as within the first area; and
determining, based at least in part on the proxemic cost map, a path from a first point in the physical environment to the target point.

9. The method of claim 8, further comprising:
determining the orientation of the user;
aligning the proxemic cost map with the orientation of the user; and
wherein the proxemic cost map comprises:
a third area that is in front of the user and extends from a first angle relative to the orientation of the user to a second angle relative to the orientation of the user, wherein the target point is within the third area; and
a fourth area that is behind the user and extends from the second angle relative to the orientation of the user to the first angle relative to the orientation of the user.

10. The method of claim 8, further comprising:
determining an occupancy map indicative of placement of one or more obstacles in the physical environment that impede movement of the robot in the physical environment, wherein the occupancy map is indicative of the plurality of areas within the physical environment and further wherein each of the plurality of areas has an obstacle cost value that is indicative of whether each of the plurality of areas contains an obstacle; and
the determining the target point is based on one or more of the obstacle cost values or the proxemic cost values.

11. The method of claim 8, further comprising:
determining an occupancy map indicative of placement of one or more obstacles in the physical environment that impede movement of the robot in the physical environment, wherein the occupancy map is indicative of a plurality of areas within the physical environment and further wherein each of the plurality of areas has an obstacle cost value that is indicative of whether each of the plurality of areas contains an obstacle;
the determining the target point comprising:
determining the orientation of the user;
determining a first proposed target point based on the orientation of the user;
determining the first proposed target point is within the first area with the first obstacle cost value that is less than a threshold value;
determining a second proposed target point that is within the second area with the second obstacle cost value that is greater than the threshold value; and
using the first proposed target point as the target point; and
the determining the path comprising:
determining a first path and a second path from the first point to the target point;
determining, based on a first sum of the proxemic cost values and obstacle cost values of the areas traversed by the first path, a first path score;
determining, based on a second sum of the proxemic cost values and obstacle cost values of the areas traversed by the second path, a second path score;
determining that the first path score is lower than the second path score; and
selecting, as the path, a possible path that has a lowest path score.

12. The method of claim 8, further comprising:
determining a user identifier associated with the user;
determining the proxemic cost map that is associated with the user identifier;
determining a first distance associated with the user identifier; and
wherein the target point is at the first distance from the location of the user.

13. The method of claim 8, further comprising:
determining a task that is associated with the user;
determining, based at least in part on the task, a first distance between the robot and the user; and
wherein the target point is located at the first distance from the location of the user.

14. The method of claim 8, further comprising:
determining the robot is at the target point;
determining that the user has moved to a second location different from the location;

determining that a distance between the location and the second location exceeds a threshold value;
determining a second distance from the second location;
determining a second target point based at least in part on the second distance; and
moving the robot to the second target point.

15. The method of claim 8, further comprising:
determining the robot is at the target point;
determining user input that is representative of a second distance between the user and the robot; and
moving the robot to a second location that is at the second distance.

16. The method of claim 8, further comprising:
determining a task that comprises the robot following the user;
determining, based on the orientation of the user, the first area that is behind the user;
determining a first distance between the robot and the user; and
wherein the target point is located at the first distance from the location of the user within the first area.

17. A method comprising:
determining a location of a user;
determining a target point based on the location of the user;
determining a proxemic cost map that represents a plurality of areas in a physical environment, wherein the proxemic cost map comprises a proxemic cost value for each area in the plurality of areas is representative of a cost associated with traversal of the area by a device;
determining a first score of a first area by summing a first obstacle cost value associated with the first area and a first proxemic cost value associated with the first area;
determining a second score of a second area by summing a second obstacle cost value associated with the second area and a second proxemic cost value associated with the second area;
determining the first score is less than the second score;
determining a target point as within the first area; and
determining, based at least in part on the proxemic cost map, a path from a first point to the target point.

18. The method of claim 17, further comprising:
determining a task that is associated with the user;
determining, based at least in part on the task, a first distance between the device and the user; and
wherein the target point is located at the first distance from the location of the user.

19. The method of claim 17, further comprising:
determining an occupancy map indicative of placement of one or more obstacles in the physical environment that impede movement of the device in the physical environment, wherein the occupancy map is indicative of a plurality of areas within the physical environment and further wherein each of the plurality of areas has an obstacle cost value that is indicative of whether each of the plurality of areas contains an obstacle; and
the determining the target point is based on one or more of the obstacle cost values or the proxemic cost values.

20. The method of claim 17, further comprising:
determining the device is at the target point;
determining that the user has moved to a second location different from the location;
determining that a distance between the location and the second location exceeds a threshold value;
determining a second distance from the second location;
determining a second target point based at least in part on the second distance; and
moving the robot to the second target point.

* * * * *

UNITED STATES PATENT AND TRADEMARK OFFICE
CERTIFICATE OF CORRECTION

| | | |
|---|---|---|
| PATENT NO. | : 11,480,968 B1 | Page 1 of 1 |
| APPLICATION NO. | : 16/116285 | |
| DATED | : October 25, 2022 | |
| INVENTOR(S) | : Atrash et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 283 days.

Signed and Sealed this
Fourth Day of February, 2025

Coke Morgan Stewart
*Acting Director of the United States Patent and Trademark Office*